United States Patent [19]

DiMarcello et al.

[11] 4,076,380
[45] Feb. 28, 1978

[54] GRADED INDEX OPTICAL FIBER

[75] Inventors: Frank Vincent DiMarcello, Clinton Township, Hunterdon County; John Charles Williams, Whippany Township, Morris County, both of N.J.

[73] Assignee: Bell Telephone Laboratories, Incorporated, Murray Hill, N.J.

[21] Appl. No.: 736,398

[22] Filed: Oct. 28, 1976

[51] Int. Cl.² ............................................. G02B 5/14
[52] U.S. Cl. ........................................... 350/96.31
[58] Field of Search ..................... 350/96 GN, 96 WG

[56] References Cited
U.S. PATENT DOCUMENTS 3,617,917  11/1971  Uchida ........................ 350/96 GN Primary Examiner—Jon W. Henry
Attorney, Agent, or Firm—Peter V. D. Wilde

[57] ABSTRACT

A graded index optical fiber with a structure which results in improved pulse dispersion characteristics is disclosed. The refractive index properties of the fiber core may be defined in terms of coaxially nested tubular regions, each of different index of refraction, which together form a radially graded index of refraction. The optical properties of each tubular region vary periodically along the longitudinal direction. The longitudinal variation of each tubular region is in approximate anti-phase with the longitudinal variation of the tubular regions immediately adjacent to it. In the disclosed structure each tubular region is composed of at least two intertwined helical ribbons of material.

5 Claims, 6 Drawing Figures

GRADED INDEX OPTICAL FIBER

BACKGROUND OF THE INVENTION

1. Field of the Invention

This invention relates to optical fibers and processes for their fabrication.

2. Description of the Prior Art

The transmission characteristics of an optical fiber must be of primary concern if the fiber is to be practical for transmitting information over long distances. Phenomena which interfere with the transmission efficiency of an optical fiber fall into two broad categories. The first involves the absorption of light within the transmitting material. Such absorption results in loss of signal and is directly related to the distance over which a signal can be transmitted without being reprocessed. Improved fabrication and material techniques have resulted in optical fibers with losses less than 5 dB/km at useful wavelengths, making possible repeater-free transmission over distances as great as 5 km.

The second optical fiber transmission property which is of concern involves the ability of the fiber to transmit pulses of light while maintaining their initial pulse width to as high a degree as possible. The bandwidth of the transmission line is directly related to this property. Degradation of the pulse width results from a number of different physical phenomena. One is material dispersion — the dependence of the velocity of light in the material on the frequency of the light being transmitted. A second and usually more significant phenomenon which also results in degradation of the pulse width is associated with the mode structure of the radiation traversing the fiber. Under certain conditions of index of refraction, fiber diameter, and wavelength, the fiber will suport only one mode. However, under other and sometimes more desirable conditions a multitude of modes may be simultaneously supported by the fiber. One may associate with each such mode a different ray path through the fiber. "Short length" paths proceed directly down the center of the fiber. "Long length" paths may reflect off the fiber walls numerous times. A different traversal time may be associated with each mode and, consequently, a pulse propagating through the fiber in a multitude of modes will be broadened.

At least two techniques have been found to reduce this "mode dispersion". One involves fabricating the fiber with high frequency longitudinal variations in its optical properties, e.g., index of refraction. Such variations are found to result in efficient conversion between the guiding modes, yielding an average traversal time and improved pulse response. The second technique for reducing mode dispersion involves grading the index of refraction of the fiber along the radial direction from a maximum at the center of the transmitting core to a minimum at its perimeter. In such a graded fiber, the velocity of light is highest near the perimeter of the transmitting core and lowest near its center. Consequently, the long path-length modes, which spend more time near the fiber perimeter, have higher average velocities, and hence traversal times which are more nearly equal to the traversal time of the short path-length modes. In this manner, the pulse dispersion is minimized.

A continuous radial gradation in index of refraction is approximated by a fiber which may be defined in terms of coaxially nested tubular regions each of different index of refraction. However, in such fibers if the radial width of each tubular region is greater than the wavelength of the light being transmitted then the theoretical improvement associated with a continuous radial gradation can only be approached and some pulse broadening still occurs. Any pulse broadening that remains increases directly with the length of the fiber, as does other broadening associated with mode dispersion.

In a commonly assigned application by S. E. Miller, (Ser. No. 710,137, filed July 30, 1976) it is shown that a low frequency longitudinal variation in index of refraction, when coupled with a nonuniform cross sectional index of refraction, yields efficient nonadiabatic mode conversion. Such mode conversion is distinct from the mode conversion obtained in prior fibers having only high frequency longitudinal variations in their optical parameters. Specifically, the prior high frequency longitudinal variations (of the order of from 1 to 10 mm) result in adiabatic mode conversion and require no cross sectional nonuniformity in the index of refraction to effect the requisite mode conversion. Nonadiabatic mode conversion, on the other hand, requires a nonuniform cross sectional index configuration coupled with a longitudinal variation in index of refraction of from 0.1 to 400 meters in period in order to effect efficient mode conversion. Such low frequency longitudinal variations lend themselves much more readily to current fabrication processes. As in the prior art fibers, resulting mode conversion occurs primarily between the guided modes rather than between the guided and radiating modes. Radiation losses are thereby kept to a minimum and the width of a pulse traversing the fiber increases directly with the square root of the fiber length, rather than directly with fiber length as is the case without efficient mode conversion.

Although any nonuniformity in cross sectional index of refraction when coupled with a low frequency longitudinal variation is sufficient to obtain nonadiabatic mode conversion, particular advantages result when the cross sectional index of refraction is graded from a maximum at the center to a minimum at the fiber perimeter. Under such circumstances, one gains the advantage of having both a radially graded fiber and a mode-mixing fiber in one single configuration.

Nonadiabatic mode conversion may be introduced into a radially graded fiber by fabricating each of the associated tubular regions with longitudinal variations in index of refraction. The variations have a period of from 0.1 to 400 meters. The longitudinal variations need only be approximately periodic and should be in approximate antiphase with the longitudinal variations of the adjacent tubular regions. Under such a circumstance, the minimum index of refraction points of a given $n^{th}$ tubular region should occur adjacent to, and approximately equal in value to, the maximum index points of the $(n+1)^{th}$ tubular region of greater radius. Departures from periodicity or from the required antiphase relationship are not critical as long as there are regions where the $n^{th}$ and $(n+1)^{th}$ regions have approximately equal index of refraction. The more frequent such regions and the greater the equality of the indices in these regions, the more efficient is the mode conversion. Consequently, a preferred structure is one in which the longitudinal variation in each tubular region is periodic and in antiphase relationship with the tubular region adjacent to it.

In the above-mentioned commonly assigned application by S. E. Miller, such fibers that have both a radially graded index configuration and longitudinal variations in index of refraction are fabricated using standard deposition processes. In such deposition, a glass cylindrical starting member may be coated either externally or internally with layers of glass material using any one of the standard deposition processes. Each layer is deposited individually by rotating the glass cylindrical starting member and simultaneously traversing it with a glass deposition device. The material composition being deposited is varied slowly compared to the traversal speeds in such a manner that ringed regions of index of refraction are obtained for each layer.

It should be emphasized that throughout the discussion of this invention the description of the fiber in terms of layers is only for greater ease of understanding. The fiber is viewed as comprising tubular regions but need not in fact have physically discernible layers. For example, the MCVD process may result in the fabrication of a fiber without physically discernible layers, and if such layers do inadvertently occur they are not germane to the efficacy of the process.

SUMMARY OF THE INVENTION

This invention is a mode-mixing optical fiber structure, and a process for fabricating a fiber with such a structure. The refractive index properties of the fiber core are conveniently defined in terms of coaxially nested tubular regions which, however, need not necessarily correspond with physically definable material layers. Each tubular region comprises at least two helical ribbons which are intertwined about each other. The index of refraction, and in a specific embodiment the thickness of the tubular region, varies periodically from ribbon to ribbon. A multitude of tubular regions, each of which comprises at least two of the above-mentioned ribbons, may be sequentially fabricated. The resulting longitudinal variations in a given tubular region are in approximate antiphase with those in the tubular region adjacent to it. The index minimum in the $n^{th}$ region is approximately equal to the index maximum in the $(n+1)^{th}$ region. Such a structure displays improved pulse response and at the same time is more amenable to the fabrication techniques currently available.

DETAILED DESCRIPTION OF THE DRAWING

Figure 1:
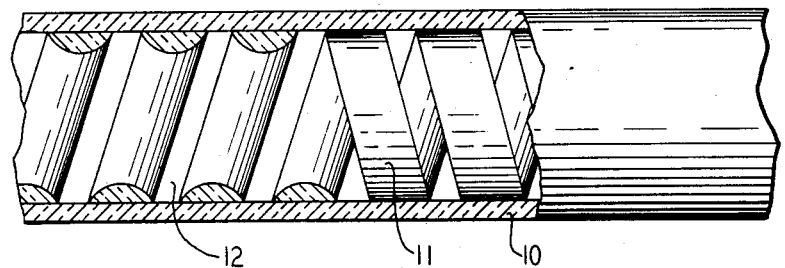
FIG. 1 is a schematic reresentation of an optical fiber preform subsequent to the deposition of the first helical ribbon of material.

The basic optical waveguide structure consists of a core and a cladding. The core comprises a material of high transmission efficiency (usually of loss less than 10 dB/km) at the wavelength $\lambda$ of interest, and has an index of refraction higher than that of the cladding. Depending upon the core-cladding index difference, the radius of the core, and $\lambda$, the fiber can support either one or a multitude of propagating modes. In order to increase mode conversion and thereby reduce the pulse dispersion present in prior art multimode fibers, longitudinal variations in index of refraction or diameter are designed into the fiber. Such variations have a period of from 1 to 10 mm depending upon the wavelength of light being transmitted.

An alternative technique to reduce pulse dispersion involves radially grading the fiber to improve its pulse response properties. In practice, it is difficult if not impossible to fabricate a fiber with a perfectly continuous radial gradation in index of refraction. The construction of such continually graded fibers becomes even more difficult when one tries to fabricate more effective gradations such as those disclosed in U.S. Pat. No. 3,904,628 which produce maximized improvement in the pulse response of the fiber. Consequently, the continually graded fiber is approximated by a multilayered fiber comprising a series of coaxially nested tubular layers. Each tubular layer has a constant index of refraction and has associated with it an axis which is approximately collinear with the fiber axis. The prevalent fabrication processes, including CVD, MCVD, plasma MCVD, and soot processes are particularly effective in fabricating such structures. (See, for example, J. B. MacChesney et al., *Applied Physics Letters*, Vol. 23, No. 6, Sept. 15, 1973, page 340; J. B. MacChesney et al., *Proceedings of the IEEE*, Vol. 62, No. 9, Sept. 1974, page 1278; R. E. Jaeger et al., *Bulletin of the American Ceramics Society*, Vol. 55, No. 4, April 1976, page 455; and U.S. Pat. No. 3,823,995, respectively.) In such processes glass layers are deposited on a glass starting member to yield a glass preform which is ultimately drawn into a fiber using the oven or laser drawing techniques. The pristine fiber may be protected with a resin sheathing applied to the fiber during the drawing process.

While the pulse response of the multilayered fiber described above approximates that of a continually radially graded optical fiber, unless the thickness of each layer is less than the wavelength of light being transmitted, the response will never equal that of the theoretical continually radially graded fiber. Under the imperfect circumstances of noncontinuous radial grading, the width of the pulse being transmitted will broaden — its ultimate width being proportional to the length of the fiber.

In order to improve the pulse response of a layered but radially graded fiber, longitudinal gradations may be introduced into each layer in order to effect nonadiabatic mode conversion. Such longitudinal variations should have a period of between 0.1 and 400 meters in the fiber although periods of between 1 and 100 meters are adequate. In a specific embodiment the longitudinal variations are in approximate antiphase with the variations in the adjoining layers, and the index minima in the $n^{th}$ layer are approximately equal in value to the index maxima in the $(n+1)^{th}$ layer of larger radius.

It should be emphasized that such longitudinal variations are significantly different both in structure and in effect than the gradations which are used to stimulate adiabatic mode conversion. The structure which stimulates adiabatic mode conversion does not require a nonuniform cross sectional index configuration nor does it require the antiphase relationship and maxima-minima equality specified in the nonadiabatic mode-mixing fiber. In addition, the prior art fiber has longitudinal variations of from 1 to 10 mm in the fiber while the longitudinal gradations required here are on the order of from 0.1 to 400 meters. The structure described here results in gross distortion of the field configuration within the fiber while the prior art structures result in only minimal perturbations in the field configuration. While both structures do result in efficient mode conversion the present structure is more easily fabricated.

In this invention a fiber structure is suggested which results in efficient mode conversion and which is amenable to simple fabrication using the existent fiber fabrication techniques. Previous applications relating to nonadiabatic mode conversion have suggested longitudinal gradations which are discontinuous in the longitudinal direction and ringlike in nature. In this invention, at least two intertwined helical regions of material of different index of refraction are deposited thereby yielding a helical structure. The composition of the material being deposited is not varied during the deposition pass.

Figure 2:
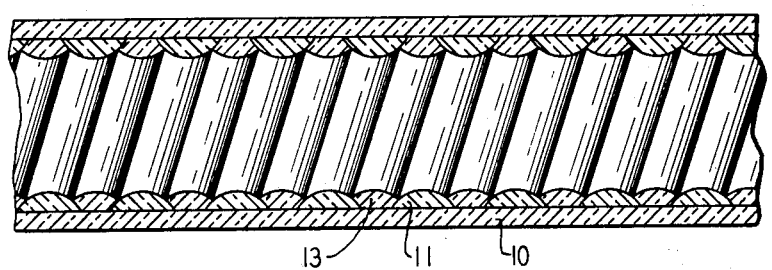
FIG. 2 is a schematic representation of the preform of FIG. 1 subsequent to deposition of a second helical ribbon of material.

In FIG. 1 a cylindrical starting member 10 is shown on which a single helix of material of constant index of refraction 11 has been deposited. Unlike the prior art fabrication process, this helix is "loose" and results in regions without any deposit as indicated by 12. In addition to this helix of material at least one other helix 13 is deposited as shown in FIG. 2. The result is a single layer of material comprising at least two approximately continuous helical regions each of which has a different but approximately constant index of refraction and each of which extends from one end of the fiber to the other. The axis associated with each helix is approximately collinear with the fiber axis and the layers so produced have a periodic longitudinal variation in index of refraction. Subsequent layers are similarly fabricated but in such a manner that the adjacent layers have periodic longitudinal variations that are in approximate antiphase relation with each other. Regions of approximate index equality occur where the minimum in the $n^{th}$ layer is adjacent to the maximum in the $(n+1)^{th}$ layer. The degree to which the variations in the adjacent layers must be in antiphase relationship is determined by the requirement that the minimum in index of refraction of the $n^{th}$ layer must be equal to the maximum in index of refraction of the $(n+1)^{th}$ layer to within 20 percent of the difference between the average index values of the $n^{th}$ and $(n+1)^{th}$ layers.

Figure 3:
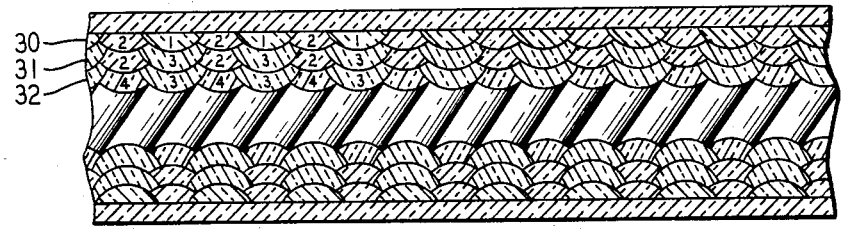
FIG. 3 is a schematic reresentation of the longitudinal variation in index of refraction which may be realized using a configuration similar to that shown in FIG. 2.

Three layers 30, 31 and 32, of the type required in this invention, are shown in FIG. 3. The specific compositions are numbered to demonstrate an exemplary antiphase relationship. While the example shows a fiber with only two helical regions, a multitude of such regions may be fabricated depending upon the particular design.

In addition to the simple helical regions described above, the fiber may be fabricated with helical regions which vary in thickness. So, for example, in the case of the two intertwined helical regions the thickness of the two regions may be different thereby yielding a longitudinal gradation not only in index of refraction but in thickness as well.

The structure shown in FIG. 3 is drawn into an optical fiber using techniques well known in the art, such as the oven or laser drawing techniques. The width, pitch, and periodicity of the helical layers deposited on the preform are determined by the value of the parameters required in the fiber and the pulling ratio used in drawing the preform into a fiber. So, for example, if longitudinal variations with a periodicity of 100 meters is required, and if the ratio between the length of the fiber and the length of the preform from which it is drawn is 1,000, then the periodicity of the longitudinal variations in the preform is 10 cm. Preforms with a structure described above and with 10 cm periodicity may be easily fabricated using the deposition techniques currently being practiced. Any difficulty which is encountered in obtaining the necessary resolution during preform deposition may be alleviated by decreasing the pulling ratio between the fiber and the preform.

The fabrication of fibers with a helical structure is further described in the following examples.

EXAMPLE 1

Figure 4:
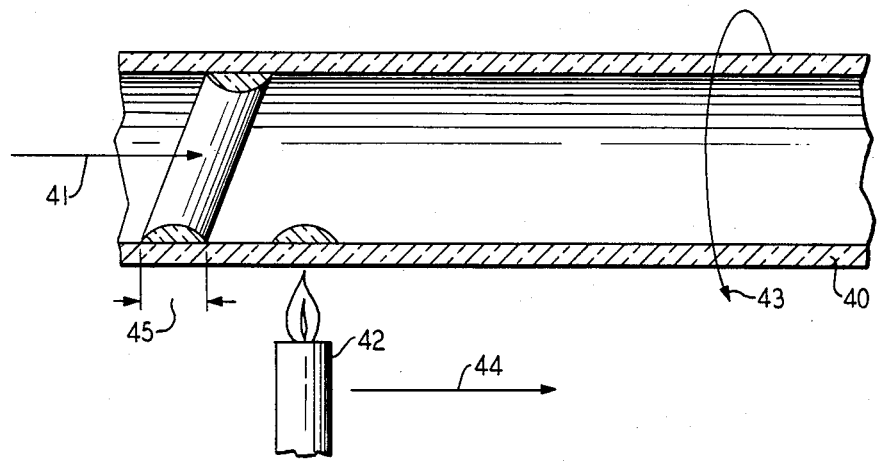
FIG. 4 is a schematic reresentation of an MCVD apparatus which may be utilized to fabricate the disclosed structure.

In this example a vapor deposition apparatus is used to practice the invention. Such an apparatus is shown in FIG. 4, where 40 is a hollow cylindrical glass starting member; 41 represents the flow of appropriate glass precursor vapors through the center of the glass starting member; 42 represents a heat source which stimulates the requisite chemical reactions necessary to transform the glass precursor vapor into a glass deposited on the internal wall of the glass starting member; 43 is a means for rotating the glass cylinder during the glass deposition; and 44 is a means for translating the heat source during the deposition. The deposition described in this figure may proceed either by means of the simple CVD or MCVD process. The glass cylinder 40 is rotated while the heat source 42 is translated resulting in the deposition of a ribbon whose width W is indicated by 45. In order to satisfactorily practice this invention when N ribbons are to be deposited, the heat source 42 must translate a distance of approximately NW during one complete rotation of the glass cylinder. The speed with which the process proceeds is limited only by the required thickness of the helical ribbon. The greater the thickness, the slower the speeds which must be used so that a thicker layer will be deposited. If the practitioner desires to fabricate helical ribbons with differing thicknesses then the translational speeds associated with the deposition of each ribbon will be different. Alternatively, the temperature of the heat source 42 or the rate of flow of the precursor vapors may be varied to increase the deposition.

After one ribbon has been deosited a second ribbon is deposited in the regions left free of deposited glass by the first deposition pass. In this manner, two or more ribbons may be deposited to yield a given layer. After the fabrication of the given layer, additional layers are fabricated in like manner. After deposition is completed and the requisite number of layers are fabricated, the preform is drawn into a fiber either directly or subsequent to being collapsed. The glass precursor vapors which are used in the fabrication of the preform are well known in the art and include silicon doped with various index of refraction affecting elements such as Ge and B. It should be noted that in this process the composition of the material being deposited is not varied during a given pass.

EXAMPLE 2

Figure 5:
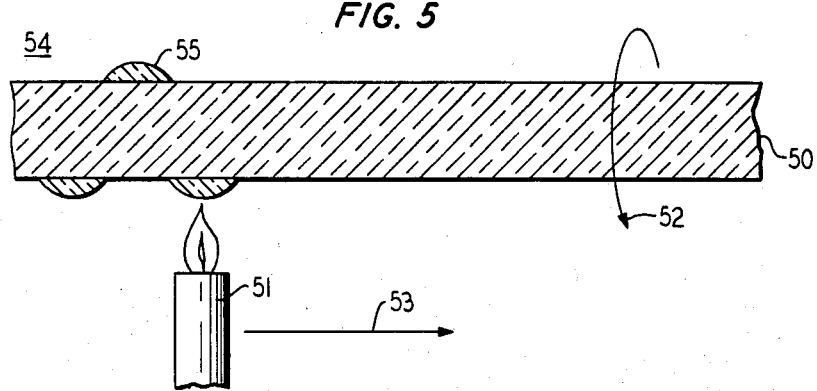
FIG. 5 is a schematic representation of a soot deposition apparatus which may be utilized to fabricate the disclosed structure.

In this example, illustrated in FIG. 5, the soot deposition process is used to fabricate the requisite structure 54. In this process, a solid glass cylindrical starting member, 50, is used. Glass is deposited on the outside of this cylinder as shown in FIG. 5. Here, 50 is the solid starting member and 51 is the soot deposition device. Rotation means 52 and translation means 53 are utilized in this embodiment as they were in the previous example. The deposition material is shown at 55.

Figure 6:
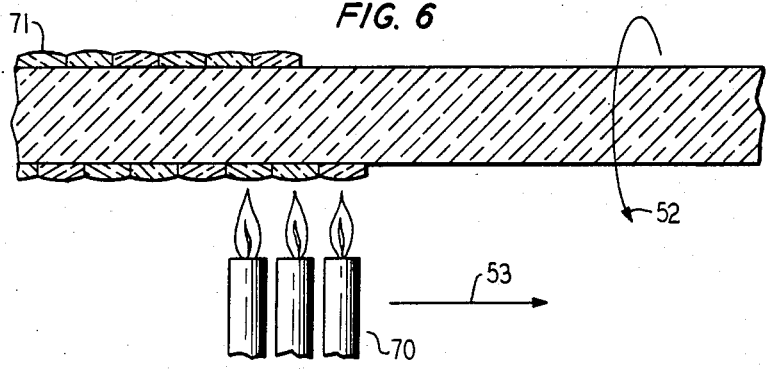
FIG. 6 is an alternative embodiment of the soot deposition apparatus.

As a result of the nature of the soot process, multiple helical ribbons can be simultaneously deposited as shown in FIG. 6. Here $n$ deposition devices 70 are used to deposit a layer exemplified by 71 comprising $n$ helical ribbons. The layer is deposited in a single pass as is evident in FIG. 6. The thickness of each helical ribbon may be varied depending on the parameters associated with each deposition device.

What is claimed is:

1. An optical fiber with a transmitting core, the refractive index properties of which are defined in terms of coaxially nested tubular regions which do not necessarily correspond with physically definable layers, comprising:
a core with a cross section of nonuniform index of refraction, the tubular regions of which core comprise at least two approximately continuous regions, each of which continuous regions has a different but approximately constant index of refraction and extends from one end of the fiber to the other end describing a helix whose axis is approximately collinear with the fiber axis, each of the tubular regions thereby having periodic longitudinal variations in index of refraction of period between 0.1 and 400 meters, the longitudinal variations in index of refraction of each tubular region being in approximate antiphase relation with the longitudinal variations in index of refraction of the tubular regions adjoining it, and the minimum index of refraction of each tubular region being approximately equal to the maximum index of refraction of the next adjacent tubular region of larger radius.

2. The device of claim 1 where the period of the longitudinal variation is between 1 and 100 meters.

3. The device of claim 1 wherein the index of refraction of the core is graded from a maximum at the core center to a minimum at its outside perimeter.

4. The device of claim 1 wherein the tubular regions are of approximately constant radius.

5. The device of claim 1 wherein the tubular regions correspond with physically definable layers.

* * * * *